Feb. 14, 1961    R. G. LARKIN ET AL    2,971,613
PROPELLER BRAKE
Filed April 19, 1957    3 Sheets-Sheet 1

INVENTORS
Robert G. Larkin,
Victor W. Peterson &
Herbert H. Schnepel
BY Paul Kilpatrick
ATTORNEY Feb. 14, 1961 R. G. LARKIN ET AL 2,971,613
PROPELLER BRAKE
Filed April 19, 1957 3 Sheets-Sheet 3

INVENTORS
Robert G. Larkin,
Victor W. Peterson &
Herbert H. Schnepel
BY Paul Fitzpatrick
ATTORNEY

United States Patent Office 2,971,613
Patented Feb. 14, 1961

2,971,613
PROPELLER BRAKE

Robert G. Larkin, Victor W. Peterson, and Herbert H. Schnepel, Indianapolis, Ind., assignors to General Motors Corporation, Detroit, Mich., a corporation of Delaware Filed Apr. 19, 1957, Ser. No. 653,885

5 Claims. (Cl. 188—110)

This invention relates to brakes and more particularly to a brake for an aircraft propeller. This invention is particularly applicable to brakes for propellers driven either by piston type or gas turbine engines in arrangements wherein either a single engine or a plurality of engines drive either a single propeller or more than one propeller. The principles of the invention may be applied to braking power elements in other fields than the field of aircraft propulsion.

When aircraft engines are inoperative it is often desirable to apply a brake to hold the propeller from rotation in either directon. It is necessary that the brake be released upon engine starting and that the brake act to absolutely prevent reverse rotation of the propeller during flight, and further that the brake be prevented from being applied during periods of operation wherein applications of the brake would be harmful to the engine, propeller or the brake itself. It is important that the brake be applied only when the propeller is rotating at low speeds in order to minimize brake wear and yet to ensure that the brake is applied with sufficient force to perform its function without undue slipping.

Various types of brakes have been utilized which conform to these requirements, such brakes being shown in the applications of Victor W. Peterson, S.N. 231,465, filed June 14, 1951, now Patent No. 2,826,255, and S.N. 313,960, filed October 9, 1952, now Patent No. 2,860,713. The propeller brakes shown in the Peterson applications utilize cone brakes that are spring applied, and pressure released and have self-energizing helical splines to apply the brake upon tendency for reverse propeller operation.

The present invention is an improvement on the brakes of the above-mentioned applications and provides in a relatively simple structure a brake that satisfies the conditions set forth above. The brake utilizes a spiral brake band that is wound on a brake drum to hold the propeller from rotation in either direction and is self-energizing to hold the brake drum and propeller from reverse rotation.

The invention is described herein in terms of the preferred embodiment in an aircraft power plant comprising an engine with power transmission to a variable pitch propeller. The power plant is provided with a brake which prevents rotation of the propeller while the engine is inoperative.

It is therefore an object of the invention to provide an improved power plant, particularly one of the turboprop type, to provide an improved braking arrangement for the power plant and to provide an improved braking control particularly suited for the type of application described above.

Briefly, the invention in its preferred embodiment comprises a brake drum connected to the member to be braked, in this case a shaft gear-connected to the aircraft propeller. A spiral brake band having one end fixed to a stationary member and the other end having gear teeth formed thereon surrounds the brake drum. A rack in engagement with the teeth on the brake band is moved by a control spring to wrap the band on the drum for braking the same. Engine operation responsive fluid pressure acts to move the rack in a band unwinding direction. The band applying spring force is controlled so as to be alternatively effective or ineffective to move the rack in a band winding direction.

Further objects and advantages of the present invention will be apparent from the following description, reference being had to the accompanying drawings wherein a preferred form of the present invention is clearly shown.

Figure 1:
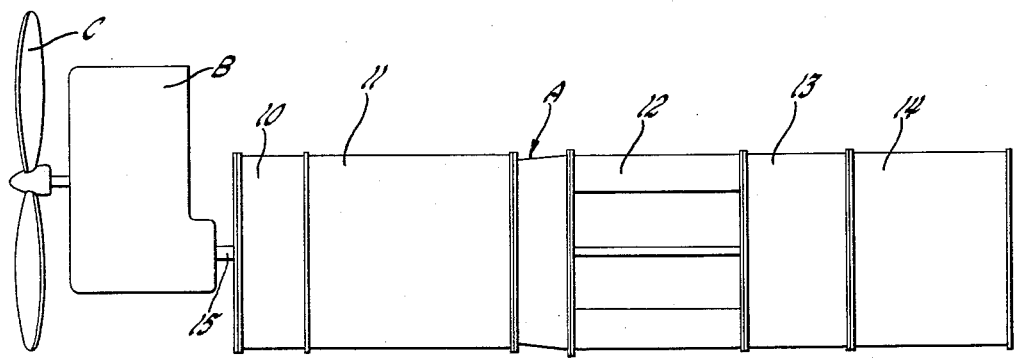
Figure 1 illustrates the aircraft power plant in which the preferred embodiment of the invention is utilized.

Referring now to the drawings in detail and more particularly to Figure 1, a gas turbine engine generally designated by A is connected to drive a reduction gear assembly B which in turn drives a variable pitch propeller C. The engine A comprises an air inlet section 10, a compressor section 11, combustion chamber area 12, a turbine section 13, and an exhaust duct 14. The engine may include one or more turbines, at least one of which is connected to drive an engine output shaft 15 which extends into the reduction gear assembly B.

Figure 2:
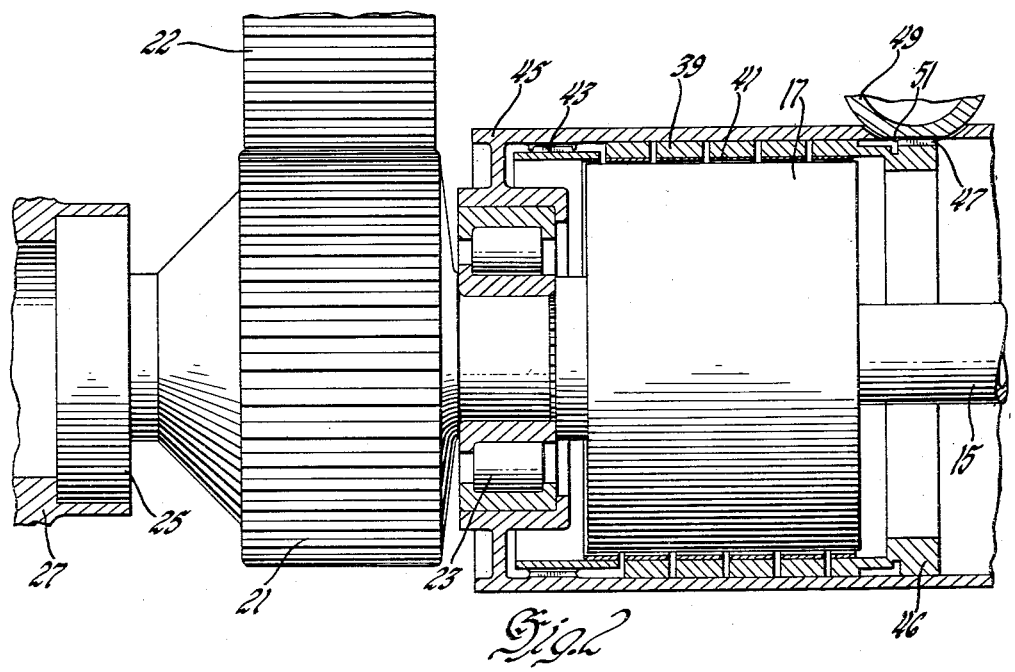
Figure 2 is a sectional view of the brake mechanism located in the power transmission unit of the power plant.

Referring now to Figure 2, which shows a portion of the gear assembly B, the gear input shaft 15 is either directly connected to an annular drive member 17 or indirectly through an overrunning clutch (not shown). The annular member 17 is splined to a pinion drive shaft 19 having fixed thereon a pinion gear 21 adapted to drive a bull gear 22 in turn connected to other reduction gearing, not shown, to drive the propeller C. The pinion shaft 19 is journalled at one end by a roller bearing 23 in a fixed portion of the reduction gear case and at the other end by a bearing not shown.

Figure 3:
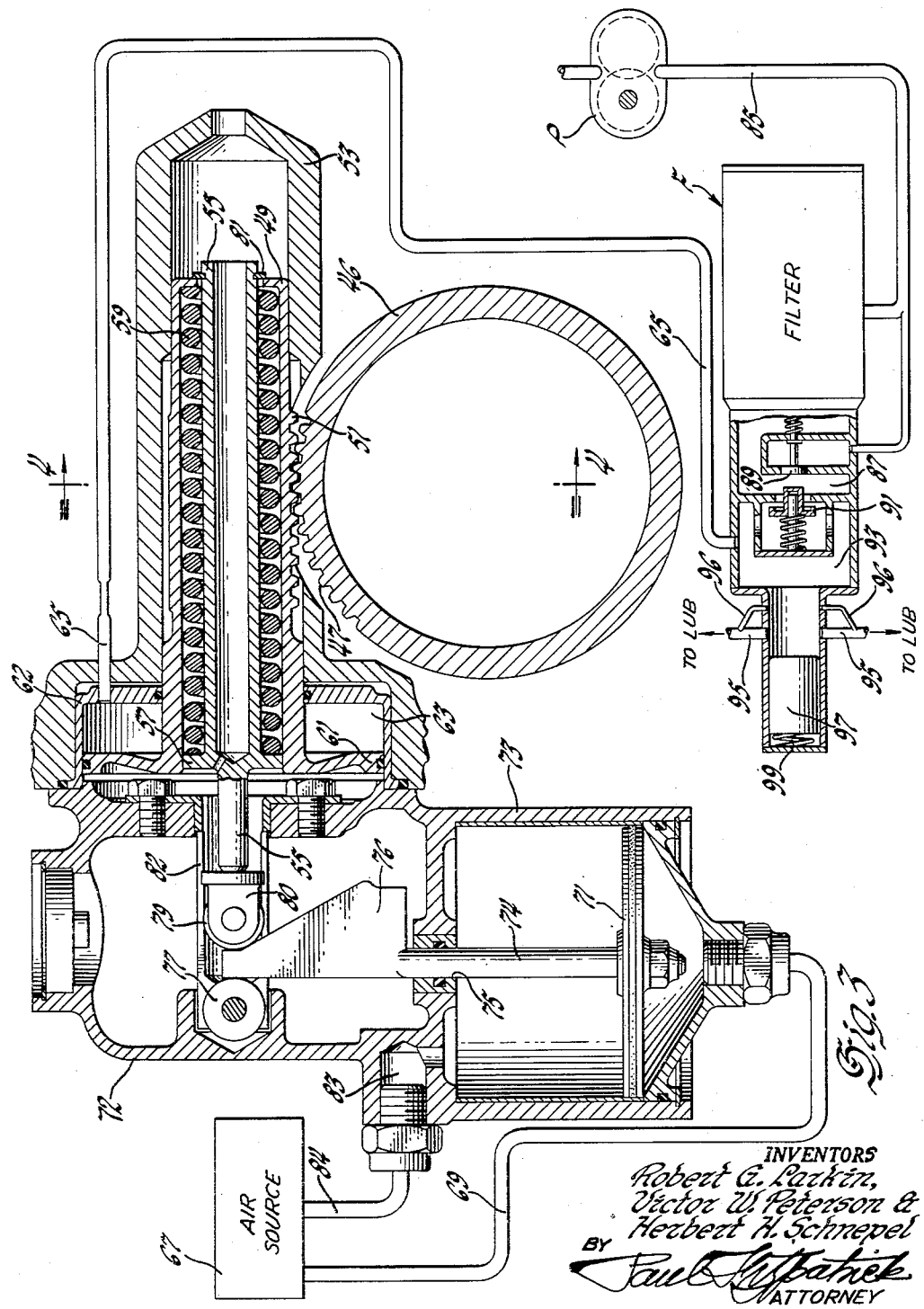
Figure 3 is an enlarged view showing the brake operating mechanism and control.
Figure 4:
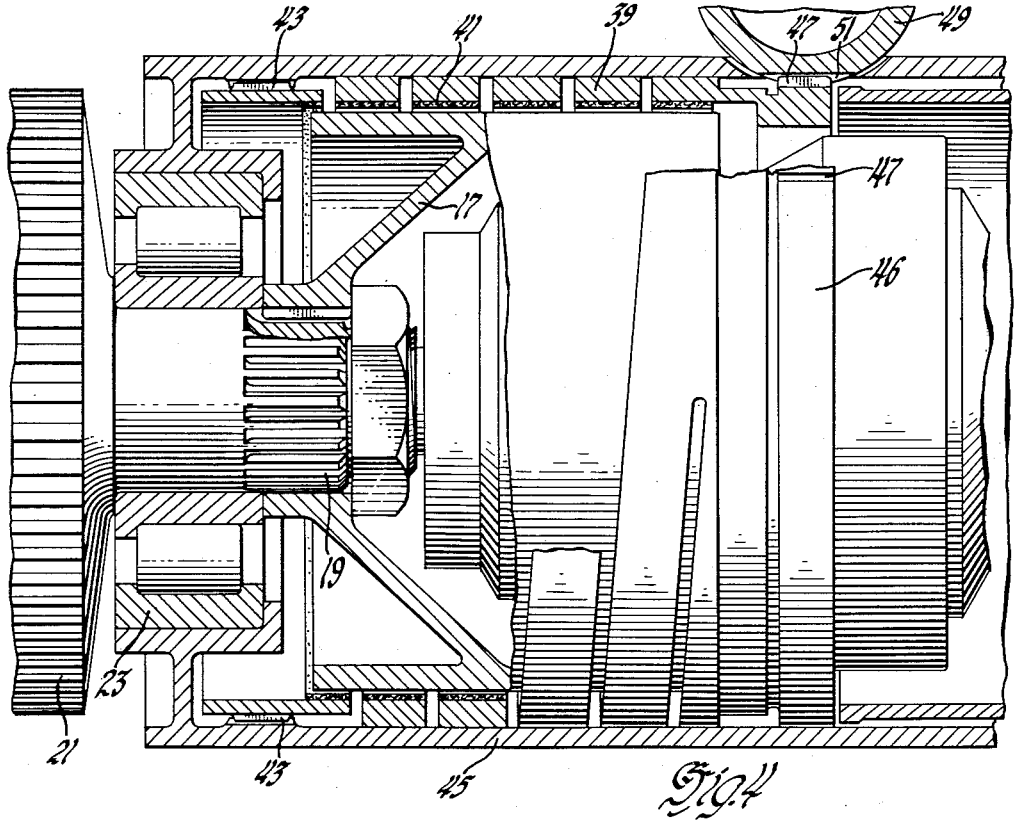
Figure 4 is an enlarged view similar to Figure 2 with a portion of the figure broken away.

Surrounding the annular member 17, which also serves as a brake drum, is a left hand spiral band 39 having on its internal surface a friction brake lining 41. The left end, as viewed in the figures, of the spiral band is connected by means of a spline 43 to a stationary clutch and brake housing 45 which is a fixed part of the gear box assembly B. The other or right end of the spiral band 39 is integral with a ring 46 which has teeth 47 formed around a portion of its circumference. As shown in Figures 2, 3 and 4 the teeth 47 engage teeth 51 of a tubular rack piston 49 slidably mounted in a housing 53 carried by a stationary portion of the gear case. Inside of the tubular rack piston 49 is slidably mounted a control plunger 55 having an enlarged flange portion 57 near one end thereof. The flange serves as a guide for reciprocation of the plunger 55 within the rack piston 49 and as a seat for a coil spring 59 which surrounds the major portion of the plunger 55 and which bears against one end of the rack piston 49. The rack piston 49 has on one end thereof an enlarged piston portion 61 that is slidably received in a cylinder 62 carried by the housing 53. The piston 61 and cylinder 62 form a chamber 63. A fluid line 65 hereinafter referred to as a brake release passage is connected into the chamber 63.

The means for controlling the operation of the rack 49 includes a controlled source 67 of air under pressure including a suitable valve that is adapted to supply air alternatively to conduit 69 or conduit 84. The conduit 69 conducts air to act on a piston 71 reciprocably mounted in a cylinder 73 carried by the stationary gear case. The piston 71 has a piston rod 74 extending through a bearing 75 carried by the cylinder 73 and has formed on its end a cam member 76. As seen in Figure 3, the cam 76 is located between a roller 77 fixed to the cylinder housing 72 and a roller 79 rotatably carried by an element 80 that bears against the rack control plunger 55. The element 80 is mounted for reciprocation normal to the movement of the piston 71 and cam 76 in a guide 82.

With the elements positioned as shown in Figure 3, the spring 59 acts between plunger flange 57 and the piston rack 49 to move the plunger 55 to the left until restricted by a snap-ring 81 carried by the plunger 55, the snap-ring 81 bearing against the piston rack 49. With the plunger shown in this position the spring exerts no force on the piston rack 49, the spring force being transmitted to plunger 55 by the snap-ring 81. With no force applied to the rack 49, the spiral band 39 is in its unwrapped or non-braking position.

A port 83 in the cylinder 73 is connected by conduit 84 to the controlled air source 67. When air is supplied through conduit 84 and port 83 into the cylinder 73 above the piston 71, the piston is moved down to the position shown in Figure 3, wherein the cam 76 allows the roller 79 to be moved to the left by the spring 59 to the position shown.

The mechanism which provides for releasing the brake during engine operation includes a pressure pump P connected to the propeller so as to be driven whenever the propeller is rotating. Pump P supplies pressure to a conduit 85 leading to a filter and valve assembly F. The filter, which may be of known type, acts to filter out undesirable material from the fluid supplied by pump P and allows the fluid to pass into a chamber 87. In the event that the filter becomes clogged, a by-pass valve 89 is provided which will allow passage of fluid from the pump P around the filter. Fluid under pressure in chamber 87 forces open a check valve 91 whereupon it flows into a lubrication and brake release supply chamber 93. Leading from the chamber 93 are a plurality of passages 95 that lead to various points in the reduction gear for lubrication thereof. The brake release passage 65 leading into the brake cylinder 62 also leads from the chamber 93. A restricting valve 97 acted on by a spring 99 acts to cut off supply of fluid under pressure to the lubricating passages 95 whenever the pressure in chamber 93 is below a fixed amount. The restricting valve 97 and the check valve 91 cooperate to maintain a minimum pressure in chamber 93 whenever the pressure from the pump P drops below a predetermined level. The operation and function of these valves will be more fully described in the statement of the operation of the brake below.

Figure 5:
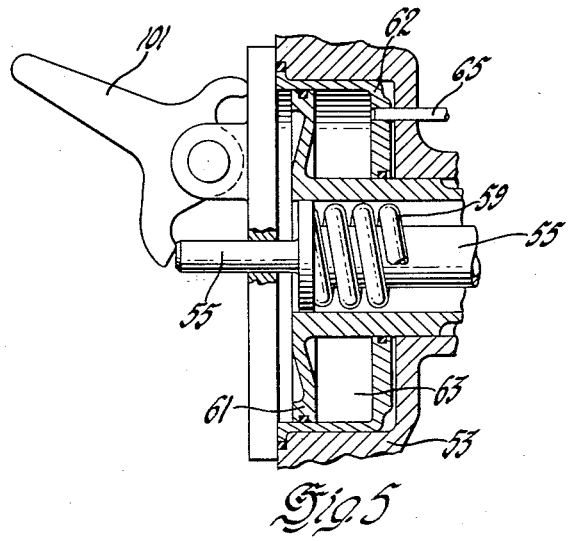
Figure 5 is a view showing an alternative control arrangement for the brake.

In place of the piston operated cam and roller assembly shown in Figure 3 there is shown in Figure 5 a manual control for plunger 55 which includes a lever 101 pivotally mounted on a stationary portion of the transmission case and which can be rotated (either directly or by means of suitable linkage, not shown,) to move the rack 49 to wind the band 39 on the brake drum 17.

Operation

With the engine stopped and the brake released the mechanism is in the position of Figure 3. Spring 59 is fully expanded and exerts no force on rack 49 to apply the band. To energize the brake, air from source 67 is supplied through pipe 69 to act on piston 74 causing cam 76 to force roller 79 and plunger 55 to the right. This compresses spring 59 whose force moves piston rack 49 to the right and winds the band 39 around drum 17.

The brake can be released prior to starting by supplying air from source 67 through pipe 84 to the upper end of piston 71, moving cam 76 downward, which releases the compressed spring 59 to move plunger 55 and roller 79 to the left until restricted by snap-ring 81. With the plunger in this position the band is allowed to release, moving rack 49 to the left since no force is applied to rack piston 49.

If the brake control cam 76 should be inadvertently left in "brake on" position when the engine is started, oil pressure from pump P flows through conduit 85, filter F, check valve 91, and conduit 65 into chamber 63 to act on piston 61 to move the rack 49 to the left or brake off position, compressing spring 59. Upon engine shutdown, the brake remains off until the oil pressure in chamber 63 decreases sufficiently to allow the force of spring 59 to move the rack 49 to the right to apply the brake band.

During starting and shutdown of the engine, restricting valve 97 prevents a major flow of oil to the lubrication passage 95, allowing only a small bleed through restricted passage 96. This is an aditional safety feature by which, if the brake is inadvertently left in the "on" position during engine starting, the restricting valve 97 causes the main oil pressure in chamber 63 to increase rapidly and force piston 61 and rack 49 to overcome the spring 59 and move the band to released position. Conversely, on engine shutdown, the restricting valve maintains sufficient oil pressure in chamber 63 to prevent actuation of the brake band until the propeller speed has dropped to a safe low value.

If, during flight the engine should fail and the propeller begin to windmill the propeller is feathered. It may also be decoupled from the engine by suitable means (not shown). When the propeller is feathered, it slows down, and when the speed reaches a low value safe for brake application, the displacement of pump P becomes insufficient to hold piston 61 against the force of spring 59. The brake is thus no longer held off. The brake may then be applied by spring 59, then or previously energized by piston 71 or lever 101. The propeller may be slightly overfeathered, so it tends to rotate reversely, if desired. If the propeller attempts to reverse rotation, the band 39 will wind itself on drum 17 with a force about ten times the normal force exerted through the control spring 59. This is due to the left hand spiral of the band 39.

The modified control shown in Figure 5 operates in the same manner as that of Figure 3 with the plunger 55 moved directly by control lever 101 instead of air operated cam 76.

The invention provides an improved brake control apparatus with automatic safety features that protect the brake mechanism as well as the propeller, transmission and engine. The principles of the invention may easily be utilized in other arts than the aircraft propeller drive art through the use of ordinary skill.

It will be apparent to those skilled in the art that many modifications of the system and components may be made within the scope of the invention which is not to be considered as limited by the detailed description of the embodiment shown.

What is claimed is:

1. A brake mechanism for braking a rotatable member including a spiral brake band spaced from and surrounding said rotatable member, a relatively fixed member spaced from and surrounding said spiral band, one end of the band being anchored to said fixed member, band control means carried by the other end of said spiral band for winding or unwinding the same on said rotatable member for respectively preventing or allowing rotation of said rotatable member, movable operating means connected to said band control means for operating the same, biasing means for at times urging said operating means in a band winding direction, fluid pressure responsive means for overcoming said biasing means to move said operating means in a band unwinding direction, and additional means independent of said fluid pressure means connected to said biasing means for rendering it effective or ineffective to urge said operating means in a band winding direction.

2. In a brake mechanism for braking a rotatable member including a spiral band spaced from and surrounding said member, a relatively fixed member, one end of said spiral member being anchored to said fixed member, gear teeth on the other end of said spiral member, a gear rack engaging said teeth for winding or unwinding said band on said rotatable member for preventing or allowing rotation thereof, a spring engaging said rack, controllable means for causing said spring to exert a force on said rack in a band winding direction, a fluid responsive piston connected to said rack for moving it in a band unwinding direction against the force of said spring, and means responsive to rotation of said rotatable member for supplying fluid under pressure to said piston.

3. A brake mechanism for braking a rotatable member including a spiral band spaced from and surrounding said rotatable member, a relatively fixed member spaced from and surrounding said spiral band, one end of said band being anchored to said fixed member, the other end of said spiral band having teeth on the outer periphery, a reciprocable rack engaging said teeth arranged to wind and unwind said band on said rotatable member for respectively preventing and allowing rotation of said rotatable member, biasing means engaging said rack, movable means engaging said biasing means for causing the same to urge the rack in a band winding direction, fluid pressure means operatievly connected to said rack for moving the rack against said biasing means in a band unwinding direction, and fluid pressure supply means connected to at times supply fluid under pressure to said fluid pressure means for causing said fluid pressure means to move said rack against said biasing means in a band unwinding direction.

4. The brake mechanism of claim 3 wherein said movable means has two positions, a first position of contact with said biasing means to cause it to exert a force in said rack to move it in a winding direction and a second position of contact with said biasing means where said biasing means exerts substantially zero force on said rack.

5. A brake mechanism for braking a rotatable member including a spiral band spaced from and surrounding said rotatable member, a relatively fixed member spaced from and surrounding said spiral band, one end of said band being anchored to said fixed member, the other end of said spiral band having teeth on the outer periphery, a reciprocable rack engaging said teeth arranged to wind and unwind said band on said rotatable member for respectively preventing and allowing rotation of said rotatable member, biasing means engaging said rack, movable means engaging said biasing means for causing the same to urge the rack in a band winding direction, fluid pressure means operatively connected to said rack for moving the rack against said biasing means in a band unwinding direction, fluid pressure supply means responsive to the speed of rotation of said rotatable means and connected to supply fluid under variable pressure to said fluid pressure means, said fluid pressure means responsive to more than a predetermined pressure supplied by said supply means to move said rack against said biasing means in a band unwinding direction and responsive to less than a predetermined pressure from said supply means to allow said biasing means to move said rack in a band winding direction.

References Cited in the file of this patent

UNITED STATES PATENTS

| | | |
|---|---|---|
| 589,779 | Hall | Sept. 7, 1897 |
| 595,732 | Pitt | Dec. 21, 1897 |
| 2,144,423 | Caldwell | Jan. 17, 1939 |
| 2,486,672 | Notestein et al. | Nov. 1, 1949 |
| 2,502,898 | Spitzer | Apr. 4, 1950 |
| 2,702,100 | Montieth | Feb. 15, 1955 |
| 2,737,018 | Bain | Mar. 6, 1956 |
| 2,826,255 | Peterson | Mar. 11, 1958 |

UNITED STATES PATENT OFFICE
CERTIFICATION OF CORRECTION

Patent No. 2,971,613                 February 14, 1961

Robert G. Larkin et al.

It is hereby certified that error appears in the above numbered paten requiring correction and that the said Letters Patent should read as corrected below.

Column 3, line 57, strike out "ing 72 and a roller 79 rotatably carried by an element 80"; line 59, after "the" insert -- plunger 55 to the right to cause spring 59 to move the --.

Signed and sealed this 18th day of July 1961.

(SEAL)
Attest:

ERNEST W. SWIDER
Attesting Officer

DAVID L. LADD
Commissioner of Patents